Patented Aug. 5, 1924.

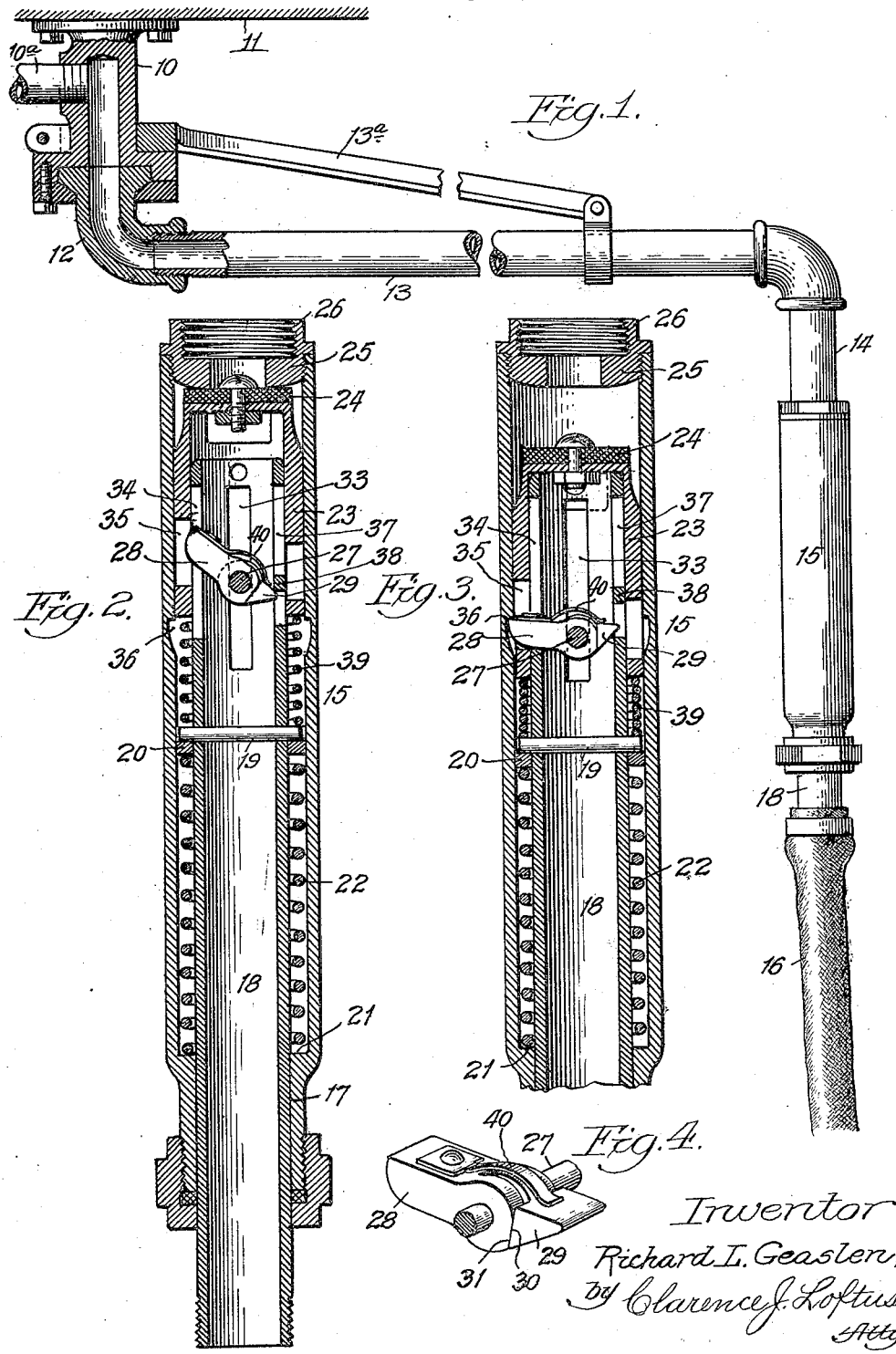

1,504,038

UNITED STATES PATENT OFFICE.

RICHARD L. GEASLEN, OF CHICAGO, ILLINOIS.

VEHICLE WASHER.

Application filed May 11, 1923. Serial No. 638,190.

*To all whom it may concern:*

Be it known that I, RICHARD L. GEASLEN, residing at Chicago, in the county of Cook and State of Illinois, have invented a certain new and useful Improvement in Vehicle Washers.

This invention is peculiarly adapted for use in connection with washers supported or suspended from the ceiling of garages or similar places for washing automobiles and the like. It has been attempted to provide different make-shift arrangements of this sort heretofore, but all such devices inherently possess certain serious objections, in that they do not contain or embody practical and efficient means whereby the water can be easily and expeditiously turned on and off. It is therefore one of the objects of this invention to provide a washer of this type with new and improved means whereby the water is easily and quickly turned on or off, with certainty, by simply giving a slight pull on the flexible hose. The broader aspects of this invention, however, is the provision of a new, novel and efficient valve which may be used not only in connection with an automobile washer, but for divers other purposes.

The above and other features of novelty, advantages and capabilities, will become apparent from a detailed description of the accompanying drawings, in which I have illustrated one form of my invention, but the construction there shown will be understood as illustrative only and not as defining the limits of my invention.

Fig. 1 is a plan view of a washer partially in section and partly broken away, showing one form of my invention.

Fig. 2 is a vertical sectional view of my new and improved valve shown in closed position which, when used as an automobile washer, has attached thereto the usual flexible rubber hose.

Fig. 3 is a sectional view of the valve showing it in open position with parts broken away, and Fig. 4 is a detail perspective view of the retaining pawl for holding the valve in open position and the tripping pawl which when co-acting with other parts, unseats the retaining pawl, permitting the valve to close.

Referring to the drawings in detail, in the embodiment shown, a flange socket 10 is secured to the ceiling 11 or other desirable place, a suitable distance above the floor, into which socket the supply pipe 10$^a$ discharges. Rotatably secured to the socket 10 by any satisfactory means, such, for example, as the ring and screw shown, in an elbow 12. Secured to the elbow 12 at right angles to the socket is a pipe 13, of any suitable length, adapted by means of the elbow connection to swing about the socket 10. Pipe 13 is provided at its free end with a downwardly extending short pipe 14. To the pipe 14 is detachably secured by screwing thereon, my new and improved valve 15, and to the opposite end of the valve there is attached the usual flexible rubber hose 16 of any desired length. The pipe 13 is held in alignment by the stay rod or wire 13$^a$.

I will now describe the construction and operation of the valve 15. This valve as best shown in Figs. 2 and 3, comprises an outer cylindrical shell having a substantial bearing 17 in which is slidably mounted the main plunger 18. This plunger extends substantially co-extensive with the outer shell. Intermediate the ends of the main plunger is a pin 19 extending therethrough. Below this pin and surrounding the main plunger is a bearing ring 20. Mounted between this ring and the integral shoulder 21 on the inside of the outer shell is a primary compression spring 22 which surrounds the main plunger. Slidably mounted between the outer shell and the upper end of the main plunger is an auxiliary comparatively short plunger 23 provided at its upper end with a suitable head to which is detachably secured a check washer 24 adapted to contact with the head 25 of the outer shell to close the opening therein for shutting off the water supply from passing through the opening in the head 25. The head 25 is detachably secured in the upper end of the outer shell and is provided with an upwardly extending integral interiorly screw threaded collar 26 by means of which the entire valve is detachably secured in place on the short pipe 14 or the like. By having the head 25 readily detachable it permits easy access to the interior of the valve for the purpose of cleaning or making repairs if and when desired.

Rotatably mounted in the upper portion of the auxiliary plunger is a pin or shaft 27 on which shaft is rotatably mounted a bifurcated retaining pawl 28. Mounted on the same shaft between the bifurcated arms of the pawl 28 is a tripping pawl 29 which tripping pawl is provided with angular shoulders 30 adapted to engage corresponding or co-operating shoulders 31 on the bifurcated arms of the retaining pawl 28 so that any downward movement or pressure on the free end of the tripping pawl 29 causes the free end of the retaining pawl to be lifted or pried upwardly and inwardly. But the upper inner meeting edge of the retaining pawl is cut away, as best shown in Fig. 4, so that the upward movement of the tripping pawl does not in any wise interfere with the retaining pawl; in other words, when pressure is exerted upwardly on the tripping pawl it merely swings about its pivot point on the shaft without in any wise interfering with the retaining pawl.

The main plunger is provided with diametrically opposite slots 33 through which passes a pin or shaft 27 which slots permit a limited up and down movement of the main plunger without interfering with the auxiliary plunger for a purpose presently to be described. There is also a slot 34, in the main plunger, so that the movement of the main plunger will not engage the retaining pawl 28 and in line with the slot 34 there is a comparatively short slot 35 in the auxiliary plunger, through which the free end of the retaining pawl 28 swings to engage the notch 36 in the outer shell for holding the auxiliary plunger or valve in open position. Diametrically opposite the slot 34 there is a slot 37 in the main plunger, provided with a cross piece 38 which when the main plunger is pulled downwardly, assuming the valve is already in open position, engages the free end of the tripping pawl 29 and as the plunger is pulled down causes the free end of the retaining pawl 28 to unseat from the notch 36 in the outer shell.

Between the auxiliary plunger and the pin 19 there is mounted around the main plunger a secondary compression spring 39 comparatively lighter than the main compression spring 22,—that is, it is sufficiently light so as to be compressed by the main spring in order to permit the main plunger to return to its normal position after the valve has been opened, but at the same time sufficiently strong to shoot the auxiliary plunger upward to closed position when the retaining pawl has been released or disengaged from the outer shell. To prevent the tripping pawl from swinging into position out of the path of the cross piece 38, I have provided a leaf spring 40 which is attached to the retaining pawl and presses downward on the upper face of the tripping pawl.

Assuming that the parts are assembled as herein described and the valve is in closed position and it is desired to cause the water to flow through the hose, the operation is as follows: the attendant simply pulls downwardly on the rubber hose, which in turn moves the main plunger downwardly, the upper ends of the pin slots engaging the pin in the auxiliary plunger thus pulling the auxiliary plunger down until the main or large pawl engages or drops into the notch in the outer shell. The operator then releases the strain on the hose and the main compression spring shoots the main plunger upwardly again to its normal position while the auxiliary plunger is held by the pawl in open position. The upward movement of the main plunger does not in any wise interfere with the auxiliary plunger or with the pawls secured thereby. When it is desired to close the valve, all that is required is to again pull down on the rubber hose which in turn draws the main plunger downwardly until the trip or cross member in one of the side slots of the main plunger engages the small pawl which in turn causes the main pawl to swing or rotate partially and at the same time draws the free end of the main pawl inwardly and upwardly causing the auxiliary plunger to move down slightly until the main pawl is brought out of engagement with the notch in the outer shell, whereupon the small compression spring shoots the auxiliary plunger to closed position and the moment the strain is again released on the rubber hose the main compression spring having a greater compression than the small spring, shoots the main plunger back to its normal position for the next operation.

Having thus described my invention, what I claim is:

1. In a washer of the class described, a swinging fluid pipe supported above the floor and provided with means for connecting with a source of supply, a flexible hose, a plunger valve, mounted between the source of supply and flexible hose, a plunger in the valve so designed that the fluid is turned on or off with certainty by moving the plunger in the same direction.

2. In a washer of the class described, a horizontally swinging fluid pipe supported above the floor and provided with means for connecting with a source of supply, a valve connected to the swinging pipe, said valve comprising a casing having mounted therein a main plunger and an auxiliary plunger slidable with respect to each other and the casing and so operatively connected that the valve is opened or closed with certainty by moving the main plunger in the same direction and a flexible hose attached to the main plunger.

3. In a valve of the class described, the combination of a casing having an intake, a main plunger, slidably mounted therein, an auxiliary plunger carrying a head or check for closing the intake, means for holding the auxiliary plunger in open position and means for releasing said holding means by the movement of the main plunger in the proper direction.

4. In a valve of the class described a casing having an intake, a main plunger within the casing having a discharge for the valve, a check for said valve operatively connected with the main plunger in such a manner that the valve is opened or closed with certainty by moving the main plunger in the same direction substantially as set forth.

In witness whereof, I have hereunto subscribed my name to this specification in the presence of two witnesses.

RICHARD L. GEASLEN.

Witnesses:
CLARENCE J. LOFTUS,
K. A. HARGADEN.